US011449591B2

(12) United States Patent
Zhang

(10) Patent No.: US 11,449,591 B2
(45) Date of Patent: Sep. 20, 2022

(54) METHOD AND DEVICE FOR TRIGGERING FUNCTION OF FUNCTION WIDGET BASED ON FINGERPRINT RECOGNITION, TERMINAL, AND STORAGE MEDIUM

(71) Applicant: GUANGDONG OPPO MOBILE TELECOMMUNICATIONS CORP., LTD., Guangdong (CN)

(72) Inventor: Zhichao Zhang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 303 days.

(21) Appl. No.: 16/806,745

(22) Filed: Mar. 2, 2020

(65) Prior Publication Data

US 2020/0201973 A1 Jun. 25, 2020

Related U.S. Application Data

(63) Continuation of application No. PCT/CN2018/104525, filed on Sep. 7, 2018.

(30) Foreign Application Priority Data

Sep. 7, 2017 (CN) .......................... 201710800591.4

(51) Int. Cl.
G06F 21/00 (2013.01)
G06F 21/32 (2013.01)
(Continued)

(52) U.S. Cl.
CPC .............. *G06F 21/32* (2013.01); *G06V 40/13* (2022.01); *G06V 40/1365* (2022.01);
(Continued)

(58) Field of Classification Search
CPC .... G06F 21/32; G06F 3/04883; G06F 1/1684; G06F 3/0488; G06V 40/13;
(Continued)

(56) References Cited

U.S. PATENT DOCUMENTS 10,075,445 B2 * 9/2018 Chen ...................... G06F 21/32
10,395,089 B2 * 8/2019 Huang ..................... G06F 3/041
(Continued)

FOREIGN PATENT DOCUMENTS

CN 103425914 A 12/2013
CN 103902147 A 7/2014
(Continued)

OTHER PUBLICATIONS

International search report issued in corresponding international application No. PCT/CN2018/104525 dated Dec. 5, 2018.
(Continued)

*Primary Examiner* — Jeffrey C Pwu
*Assistant Examiner* — William A Corum, Jr.
(74) *Attorney, Agent, or Firm* — Young Basile Hanlon & MacFarlane, P.C.

(57) ABSTRACT

A method and device for fingerprint recognition, a terminal, and a storage medium are provided, which belong to the technical field of information processing. The method is applicable to a terminal and includes the following. When a touch operation performed on a specified function widget of a current display interface of the terminal is detected and duration of the touch operation reaches preset duration, a fingerprint sensor disposed under a display area displaying the specified function widget is activated. Fingerprint information entered via the touch operation is collected with the fingerprint sensor. Security verification is performed on the
(Continued)

fingerprint information. If the security verification of the fingerprint information passes, a function of the specified function widget is triggered.

16 Claims, 13 Drawing Sheets

(51) Int. Cl.
*G06V 40/13* (2022.01)
*G06V 40/70* (2022.01)
*G06V 40/16* (2022.01)
*G06V 40/12* (2022.01)
*G06F 3/04883* (2022.01)

(52) U.S. Cl.
CPC ............ *G06V 40/166* (2022.01); *G06V 40/70* (2022.01); *G06F 3/04883* (2013.01)

(58) Field of Classification Search
CPC .. G06V 40/1365; G06V 40/166; G06V 40/70; H04M 1/724634; H04M 2250/22; G06K 9/00
See application file for complete search history.

(56) References Cited

U.S. PATENT DOCUMENTS

| | | | |
|---|---|---|---|
| 2006/0210126 A1* | 9/2006 | Cho | G07C 9/37 382/124 |
| 2009/0327744 A1* | 12/2009 | Hatano | G06F 21/32 726/19 |
| 2016/0127900 A1* | 5/2016 | John Archibald | H04W 4/80 726/7 |
| 2016/0321441 A1* | 11/2016 | Tonoyan | G06F 21/32 |
| 2017/0053149 A1* | 2/2017 | Jiang | G06V 40/1365 |
| 2018/0367656 A1* | 12/2018 | Kim | G06V 40/161 |
| 2020/0074198 A1* | 3/2020 | Oh | G06V 40/1312 |
| 2020/0089857 A1* | 3/2020 | Xu | G06V 40/1365 |

FOREIGN PATENT DOCUMENTS

| | | |
|---|---|---|
| CN | 103942481 A | 7/2014 |
| CN | 104866750 A | 8/2015 |
| CN | 105335053 A | 2/2016 |
| CN | 105574393 A | 5/2016 |
| CN | 106815508 A | 6/2017 |
| CN | 106951761 A | 7/2017 |
| CN | 107132976 A | 9/2017 |
| CN | 107480502 A | 12/2017 |
| EP | 3182314 A1 | 6/2017 |
| JP | 2011049876 A | 3/2011 |

OTHER PUBLICATIONS

Extended European search report issued in corresponding European application No. 18853972.0 dated Jul. 24, 2020.
The first OA with English Translation issued in corresponding CN application No. 201710800591.4 dated Apr. 24, 2019.
The second OA with English Translation issued in corresponding CN application No. 201710800591.4 dated Aug. 22, 2019.
English translation of Third Office Action issued in corresponding CN application No. 201710800591.4 dated Mar. 24, 2020.
English translation of Decision of Rejection issued in corresponding CN application No. 201710800591.4 dated Jun. 2, 2020.

* cited by examiner

METHOD AND DEVICE FOR TRIGGERING FUNCTION OF FUNCTION WIDGET BASED ON FINGERPRINT RECOGNITION, TERMINAL, AND STORAGE MEDIUM

CROSS-REFERENCE TO RELATED APPLICATION(S)

This application is a continuation of International Application No. PCT/CN2018/104525, filed on Sep. 7, 2018, which claims priority to Chinese Patent Application No. 201710800591.4, filed on Sep. 7, 2017, the disclosures of both of which are hereby incorporated by reference in their entireties.

TECHNICAL FIELD

This disclosure relates to the technical field of information processing, and more particularly to a method and device for fingerprint recognition, a terminal, and a storage medium.

BACKGROUND

With the rapid development of information processing technologies, fingerprint recognition technologies are widely used in terminals. For example, the fingerprint recognition technologies can be applied to functions of the terminal such as payment, login, unlocking, voice, short messages, that is, these functions can be decrypted for usage based on fingerprint recognition.

In the related art, when a specified function of a terminal needs to be decrypted, an icon associated with the specified function is clicked by a user, and then the terminal displays fingerprint decryption prompt information (e.g., the fingerprint decryption prompt information is "Please enter your fingerprint") on an interface of the terminal upon detecting the click operation performed on the icon. Then, the user puts his/her finger at a designated position of the terminal (e.g., a position where a HOME button is located) to enter a fingerprint. As such, the terminal can collect and recognize the fingerprint of the user, and decrypt the specified function based on fingerprint recognition.

SUMMARY

In one aspect, a method for fingerprint recognition is provided. The method is applicable to a terminal. The terminal includes at least one fingerprint sensor disposed under a display screen of the terminal. The method includes the following. When a touch operation performed on a specified function widget of a current display interface of the terminal is detected and duration of the touch operation reaches preset duration, a fingerprint sensor disposed under a display area displaying the specified function widget is activated. Fingerprint information entered via the touch operation is collected with the fingerprint sensor. Security verification is performed on the fingerprint information. In response to the security verification of the fingerprint information being passed, a function of the specified function widget is triggered.

In another aspect, a method for fingerprint recognition is provided. The method is applicable to a terminal. The method includes the following. A specified function widget is displayed on a current display interface of the terminal. When a touch operation performed on the specified function widget of the current display interface of the terminal is detected and duration of the touch operation reaches preset duration, fingerprint information entered via the touch operation performed on a display area displaying the specified function widget is collected. In response to security verification of the fingerprint information being passed, a function of the specified function widget is triggered.

In another aspect, a terminal is provided. The terminal includes at least one processor and a computer readable storage. The computer readable storage is coupled to the at least one processor and stores at least one computer executable instruction thereon which, when executed by the at least one processor, is operable with the at least one processor to execute the operations of any of the above method for fingerprint recognition.

BRIEF DESCRIPTION OF DRAWINGS

In order to describe technical solutions of embodiments clearly, the following will give a brief description of accompanying drawings used for describing the embodiments. Apparently, the accompanying drawings described below are merely some embodiments. Those of ordinary skill in the art can also obtain other accompanying drawings based on the accompanying drawings described below without creative efforts.

DETAILED DESCRIPTION

Figure 1:
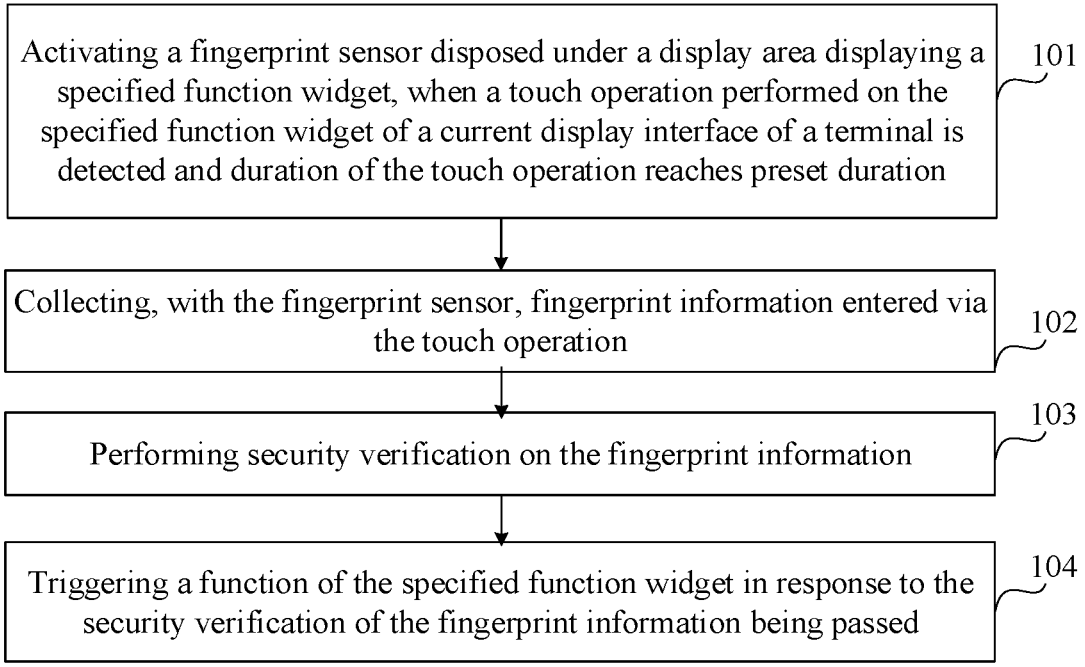
FIG. 1 is a schematic flow chart illustrating a method for fingerprint recognition according to embodiments.

Embodiments of the disclosure will be described in detail in combination with the accompanying drawings such that the object, technical solutions, and advantages of the disclosure will be more apparent.

Before describing embodiments of the disclosure in detail, terms, application scenarios, and execution bodies are briefly introduced below.

First, the terms involved in various embodiments of the disclosure are briefly introduced.

Fingerprint sensor: the fingerprint sensor is configured to implement fingerprint collection.

Fingerprint collecting component: the fingerprint collecting component is usually integrated by one or more fingerprint sensors. Each fingerprint sensor can be considered as a fingerprint collecting unit of the fingerprint collecting component.

Next, the application scenarios involved in various embodiments of the disclosure are briefly introduced.

With the rapid development of terminal technologies, terminals can achieve more and more functions. In actual application scenarios, functions (e.g., payment, short message, voice, etc.) can be encrypted according to user's actual needs. When an encrypted function is needed, the encrypted function needs to be decrypted to trigger the encrypted function. Taking a payment function as an example, it is generally necessary to perform decryption to realize payment. With the continuous development of fingerprint recognition technologies, fingerprint decryption has been widely used. However, efficiency of decrypting a function with the method based on the fingerprint recognition technologies provided in the related art is relatively low. To this end, a method for fingerprint recognition is provided according to embodiments of the disclosure, and by means of this method an encrypted function can be quickly and effectively decrypted.

Next, the execution bodies involved in various embodiments of the disclosure are briefly introduced.

The method for fingerprint recognition involved in embodiments of the disclosure may be executed by a terminal provided with a display screen. The terminal includes one or more fingerprint sensors disposed under the display screen of the terminal. The one or more fingerprint sensors are integrated into the fingerprint collecting component. The one or more fingerprint sensors of the fingerprint collecting component can collect fingerprints on any area of the display screen, in other words, the one or more fingerprint sensors are disposed corresponding to all areas of the display screen.

The terminal can achieve a variety of functions. In practice, one or some of the variety of functions can be encrypted according to user's actual needs. For example, a short message function can be encrypted. When the encrypted function is needed, the terminal can decrypt the encrypted function by adopting the method for fingerprint recognition. For details of some possible embodiments, reference may be made to related descriptions of embodiments illustrated in FIG. 1 or FIG. 2.

In practice, the terminal may be a mobile phone, a tablet computer, a computer, or the like, which is not limited herein.

While the terms, application scenarios, and execution bodies are briefly introduced, a method for fingerprint recognition of embodiments of the disclosure will be described with reference to the accompanying drawings below.

Embodiments of the disclosure provide a method for fingerprint recognition. As illustrated in FIG. 1, the method is applicable to a terminal (e.g., the foregoing terminal) and includes the following.

At block 101, when a touch operation performed on a specified function widget of a current display interface of the terminal is detected and duration of the touch operation reaches preset duration, a fingerprint sensor disposed under a display area displaying the specified function widget is activated.

At block 102, fingerprint information entered via the touch operation is collected with the fingerprint sensor.

At block 103, security verification is performed on the fingerprint information.

At block 104, when the security verification of the fingerprint information passes, a function of the specified function widget is triggered.

According to embodiments, when the touch operation performed on the specified function widget of the current display interface of the terminal is detected and the duration of the touch operation reaches the preset duration, it indicates that the function of the specified function widget needs to be decrypted to achieve the function of the specified function widget. To this end, the fingerprint sensor corresponding to the display area displaying the specified function widget is activated and the fingerprint information entered via the touch operation is collected with the fingerprint sensor. The security verification is performed on the fingerprint information. If the security verification of the fingerprint information passes, a current decryption operation is determined to be safe, and the function of the specified function widget is triggered. In this way, efficiency of decrypting of the function can be improved.

In some embodiments, the security verification is performed on the fingerprint information as follows. When the fingerprint information is identical with valid fingerprint information stored in advance, determine that the security verification of the fingerprint information passes. When the fingerprint information is different from the valid fingerprint information stored in advance, determine that the security verification of the fingerprint information fails.

In some embodiments, after determining that the security verification of the fingerprint information fails, the method further includes the following. Fingerprint-entering prompt information is displayed on the current display interface, where the fingerprint-entering prompt information is used for prompting a user to re-enter a fingerprint.

In some embodiments, the current display interface refers to a user interface (UI) currently displayed on the terminal. In one possible embodiment, the current display interface can also be referred to as a terminal current interface, which is not limited herein.

In some embodiments, after determining that the security verification of the fingerprint information fails, the method further includes the following. The number of recognition failures is counted, where the number of recognition failures is the number of consecutive fingerprint recognition failures. When the number of recognition failures reaches a preset number, a password entering interface is displayed on the current display interface to prompt a user to enter a password via the password entering interface.

In some embodiments, when the security verification of the fingerprint information passes, the function of the specified function widget is triggered as follows. When the security verification of the fingerprint information passes, whether the touch operation is a first sliding operation is detected, where a start position touched via the first sliding operation is within the display area displaying the specified function widget, and a final position touched via the first sliding operation is within a first target area. The first target area is a closed area of the current display interface of the terminal and the first target area does not belong to (i.e., is not within) the display area displaying the specified function widget. Upon detecting that the touch operation is the first sliding operation, the function of the specified function widget is triggered.

In some embodiments, the method further includes the following. The fingerprint sensor is disabled upon detecting that the touch operation is a second sliding operation, where a start position touched via the second sliding operation is within the display area of the specified function widget, and a final position touched via the second sliding operation is within a second target area. The second target area is connected to or separated from the display area displaying the specified function widget and the first target area.

In some embodiments, when the security verification of the fingerprint information passes, the function of the specified function widget is triggered as follows. When the security verification of the fingerprint information passes, whether a final position touched via the touch operation falls into the display area displaying the specified function widget is detected. Upon detecting that the final position touched via the touch operation falls into the display area displaying the specified function widget, a confirmation popup window is displayed on a current user interface. The confirmation popup window includes a confirmation button and confirmation prompt information, where the confirmation prompt information is used for informing a user of that the security verification passes and querying whether to trigger the function of the specified function widget. When the confirmation button is clicked, the function of the specified function widget is triggered.

In some embodiments, when the security verification of the fingerprint information passes, the function of the specified function widget is triggered as follows. When the security verification of the fingerprint information passes, an image is collected with a front camera of the terminal. When the image collected contains a face and the face and the fingerprint information belong to a same user, the function of the specified function widget is triggered.

All the above-mentioned technical solutions may be combined or organized to form other embodiments of the disclosure, and it will not be described in further detail herein.

Figure 2:
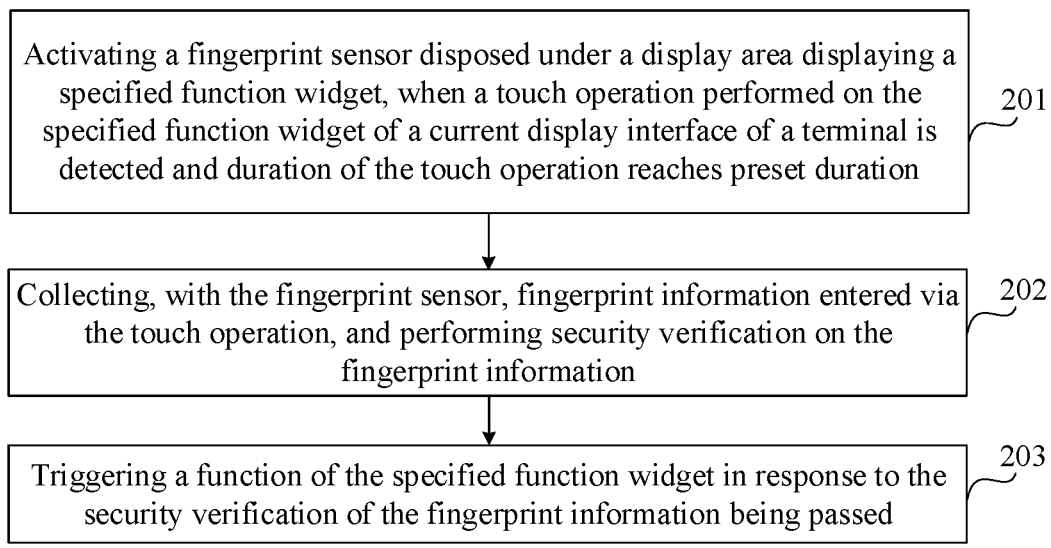
FIG. 2 is a schematic flow chart illustrating a method for fingerprint recognition according to embodiments.

Embodiments of the disclosure provides a method for fingerprint recognition. As illustrated in FIG. 2, the method is applicable to a terminal (e.g., the foregoing terminal) and includes the following.

At block 201, when a touch operation performed on a specified function widget of a current display interface of the terminal is detected and duration of the touch operation reaches preset duration, a fingerprint sensor disposed under a display area displaying the specified function widget is activated.

As described above, in actual application scenarios, the terminal can achieve a variety of functions and support encryption of the variety of functions. As an example, when a short message function needs to be encrypted, the short message function is encrypted by means of an encryption function of the terminal. As another example, the encrypted function is decrypted when the encrypted function needs to be triggered. To this end, decryption of the encrypted function based on fingerprint recognition is provided according to embodiments of the disclosure. The specific implementations are as follows.

Upon detecting a touch operation of a user performed on the specified function widget, the terminal determines that a function of the specified function widget needs to be decrypted. According to embodiments, when the touch operation performed on the specified function widget is detected and the duration of the touch operation reaches the preset duration, the fingerprint sensor disposed under the display area displaying the specified function widget is activated, such that the function can be decrypted based on fingerprint recognition.

The preset duration herein may be set by a user according to user's actual needs, or may be set by default, which is not limited herein.

Generally, the preset duration is set relatively long (e.g., 10 milliseconds). In this way, when the terminal detects a long-press touch operation performed on the specified function widget, the fingerprint sensor disposed under the display area displaying the specified function widget is activated.

Figure 3:
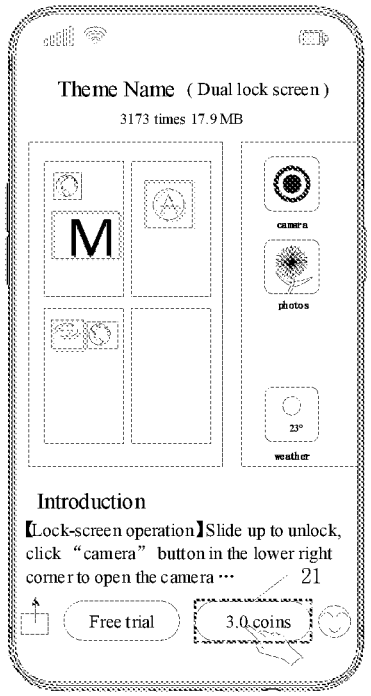
FIG. 3 is a schematic diagram illustrating an interface displayed on a display screen according to embodiments.

As illustrated in FIG. 3, the encrypted function is a "theme download" function and the specified function widget is a payment function button (i.e., "3.0 coins" illustrated in FIG. 3) for example. When detecting a long-press touch operation of a user performed on the payment function button, the terminal determines that a decryption operation needs to be performed. Accordingly, the terminal activates the fingerprint sensor disposed under the display area displaying the specified function widget, where the display area displaying the specified function widget is an area 21 illustrated in FIG. 3.

According to embodiments, since one or more fingerprint sensors are disposed under the display screen of the terminal, the terminal can collect fingerprints on any area of the display screen. In order to save power consumption, the terminal may only activate the fingerprint sensor disposed under the display area displaying the specified function widget.

Figure 4:
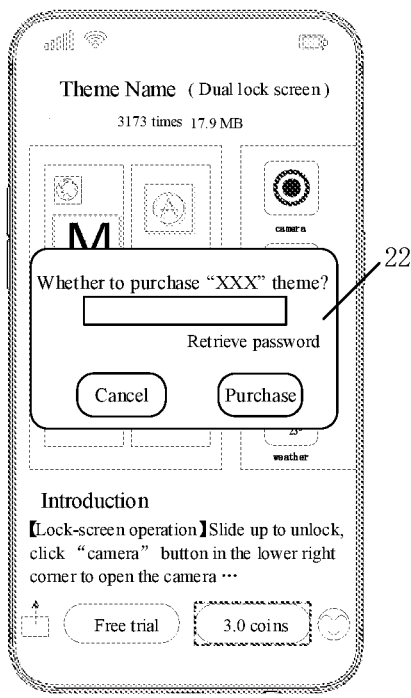
FIG. 4 is a schematic diagram illustrating an interface displayed on the display screen according to other embodiments.

Embodiments of the disclosure are merely described taking decryption based on fingerprint recognition as an example, that is, when the terminal detects the touch operation performed on the specified function widget of the current display interface of the terminal and the duration of the touch operation reaches the preset duration, the fingerprint sensor disposed under the display area displaying the specified function widget is activated. In actual application scenarios, decryption based on password entering may be adopted. For instance, when a click operation performed on the specified function widget is detected, the terminal determines that the user needs to enter a password for decryption. In this case, the terminal displays a password entering interface (e.g., a password entering interface 22 illustrated in FIG. 4) on the current display interface. As such, the user can decrypt the encrypted function with a password entered via the password entering interface 22. It should be noted that, embodiments of the disclosure are not limited to the foregoing decryption manners.

At block 202, fingerprint information entered via the touch operation is collected with the fingerprint sensor, and security verification is performed on the fingerprint information.

After the terminal activates the fingerprint sensor, the fingerprint information entered by the user can be collected with the fingerprint sensor. The fingerprint information for example is a fingerprint image.

In some possible embodiments, performing the security verification on the fingerprint information is as follows.

In a first possible embodiment, when the fingerprint information is identical with valid fingerprint information stored in advance, the terminal determines that the security verification of the fingerprint information passes.

In actual application scenarios, the terminal may collect fingerprint information of a user in advance and store the collected fingerprint information as complete valid fingerprint information. In this way, fingerprint information subsequently entered by the user can be recognized based on the valid fingerprint information.

After the fingerprint sensor collects the fingerprint information, the terminal can compare the fingerprint information collected with the valid fingerprint information stored in advance to determine whether the fingerprint information is identical with the valid fingerprint information stored in advance.

The valid fingerprint information for example is a valid fingerprint image. The terminal compares a fingerprint image collected with the valid fingerprint image to determine whether the fingerprint image collected is identical with the valid fingerprint image. If yes, the terminal determines that the security verification of the fingerprint information passes.

In a second possible embodiment, when the fingerprint information is different from the valid fingerprint information stored in advance, the terminal determines that the security verification of the fingerprint information fails.

As an example, the fingerprint information collected is a fingerprint image and the valid fingerprint information is a valid fingerprint image. If the fingerprint image is different from the valid fingerprint image, the terminal determines that the security verification of the fingerprint information fails.

In some embodiments, when the terminal determines that the security verification of the fingerprint information fails, skip the triggering of the function of the specified function widget. As an example, for encrypted voices, when the terminal determines that the security verification of the fingerprint information fails, playback of the encrypted voices is prohibited. As another example, for a payment function, when the terminal determines that the security verification of the fingerprint information fails, a payment operation cannot be completed.

In some embodiments, upon determining that the security verification of the fingerprint information fails, fingerprint-entering prompt information is displayed on the current display interface, where the fingerprint-entering prompt information is used for prompting a user to re-enter a fingerprint.

Figure 5:
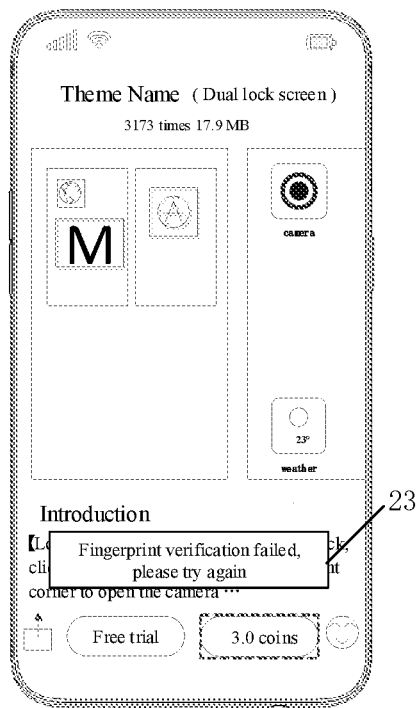
FIG. 5 is a schematic diagram illustrating an interface displayed on the display screen according to other embodiments.

In actual application scenarios, if the security verification of the fingerprint information fails, there may be a case where the user uses a wrong finger to touch the specified function widget. In order to further guide the user to re-enter fingerprint information, the terminal displays fingerprint-entering prompt information on the current display interface. In practice, the fingerprint-entering prompt information may be word information (e.g., prompt information 23 illustrated in FIG. 5), or other information such as a prompt picture.

The word information may also be referred to as text information, and the text information may include at least one of text, letters, and characters.

Embodiments of the disclosure are merely described taking displaying the fingerprint-entering prompt information by the terminal on the current display interface as an example. In other embodiments, the terminal may adopt other manners to prompt the user that the security verification of the fingerprint information fails, and embodiments of the disclosure are not particularly restricted. For example, the terminal can activate a vibration mode while displaying the fingerprint-entering prompt information on the current display interface, to prompt the user that the security verification of the fingerprint information fails.

Activating the vibration mode herein refers to activating a vibrator component of the terminal and generating vibration with the vibrator component, so that the user pays attention to the terminal and realizes that the security verification of the fingerprint information fails.

In some embodiments, the number of recognition failures is counted. The number of recognition failures is the number of consecutive fingerprint recognition failures. When the number of recognition failures reaches a preset number, a password entering interface is displayed on the current display interface to prompt the user to enter a password via the password entering interface.

The preset number herein may be set by a user according to user's actual needs, or may be set by default, which is not limited herein. As an example, the preset number is set to be seven, or the like.

In actual application scenarios, if the security verification of the fingerprint information still fails after the user touches the specified function widget corresponding to the encrypted function multiple times, there may be a case where the terminal does not store valid fingerprint information of the user. In order to avoid affecting user's normal use of the function of the specified function widget, the terminal counts the number of consecutive fingerprint recognition failures (i.e., the number of recognition failures). When the counted number of recognition failures reaches the preset number, the password entering interface is displayed on the current display interface. In this way, the user can enter a password via the password entering interface and implement decryption in a password entering manner.

Figure 6:
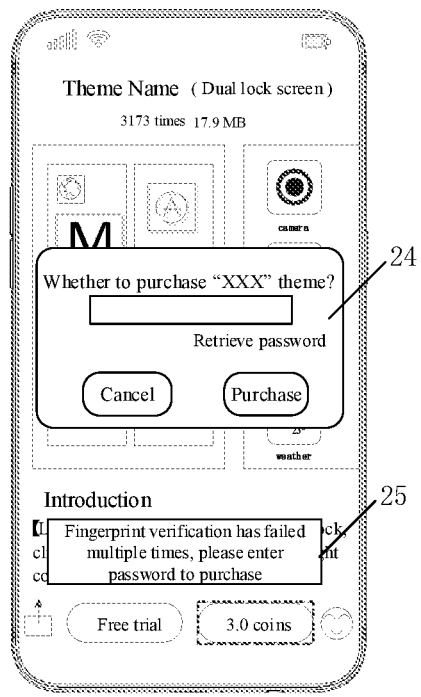
FIG. 6 is a schematic diagram illustrating an interface displayed on the display screen according to other embodiments.

For example, upon detecting that the counted number of recognition failures reaches the preset number, as illustrated in FIG. 6, a password entering interface 24 is displayed on the current display interface, and then the user can enter a password via the password entering interface 24 to decrypt the function of the specified function widget.

When the terminal detects that the counted number of recognition failures reaches the preset number, in addition to displaying the password entering interface on the current display interface, prompt information of repeated fingerprint verification failures may also be displayed on the current display interface. For instance, prompt information 25 illustrated in FIG. 6 is used for prompting the user that the security verification still fails after the fingerprint verification is repeated multiple times.

In some embodiments, after a correct password is entered by the user via the password entering interface, the terminal clears the number of recognition failures currently counted, so that a new round of counting of the number of recognition failures can be performed.

At block 203, when the security verification of the fingerprint information passes, a function of the specified function widget is triggered.

The function of the specified function widget can be triggered after the terminal determines that the security verification of the fingerprint information passes. As an example, for encrypted voices, after the terminal determines that the security verification of the fingerprint information passes, the encrypted voice is played. As another example, for a payment function, after the terminal determines that the security verification of the fingerprint information passes, a payment operation can be completed.

In some possible embodiments, in order to avoid a situation where the function of the specified function widget is triggered due to a user's accidental operation because the user does not know that his or her fingerprint entered via an operation performed on the specified function widget can be recognized, after the security verification of the fingerprint information passes, the terminal may further detect the touch operation and perform operations related to the detection. Embodiments of the disclosure include, but are not limited to, the following three application scenarios.

The first application scenario is as follows.

(1) When the security verification of the fingerprint information passes, whether a final position touched via the touch operation falls into the display area displaying the specified function widget is detected.

According to embodiments, if the security verification of the fingerprint information passes, the terminal detects whether the final position touched via the touch operation falls into the display area displaying the specified function widget. It should be noted that, for a touch operation that can be received by the terminal, the touch operation performed on a touch screen of the terminal may last for a time period. A position of the touch operation at the start of the time period is a start position touched via the touch operation, and a position of the touch operation at the end of the time period is the final position touched via the touch operation. The terminal can detect whether the final position touched via the touch operation belongs to the display area displaying the specified function widget.

(2) Upon detecting that the final position touched via the touch operation falls into the display area displaying the specified function widget, a confirmation popup window is displayed on a current user interface of the terminal In some embodiments, the confirmation popup window includes a confirmation button and confirmation prompt information. The confirmation prompt information is used for informing a user of that the security verification passes and querying whether to trigger the function of the specified function widget.

For example, the terminal can display the confirmation popup window on the current user interface of the terminal when the final position touched via the touch operation falls into the display area displaying the specified function widget. The confirmation popup window is used to further ask the user whether to trigger the function of the specified function widget.

(3) When the confirmation button is clicked, the function of the specified function widget is triggered.

According to embodiments, in the case of determining that the confirmation button is clicked, the function of the specified function widget is triggered. As can be seen, in the first application scenario, the terminal can effectively avoid a situation where the function of the specified function widget is triggered due to a user's accidental operation while the user does not known the truth.

Figure 7:
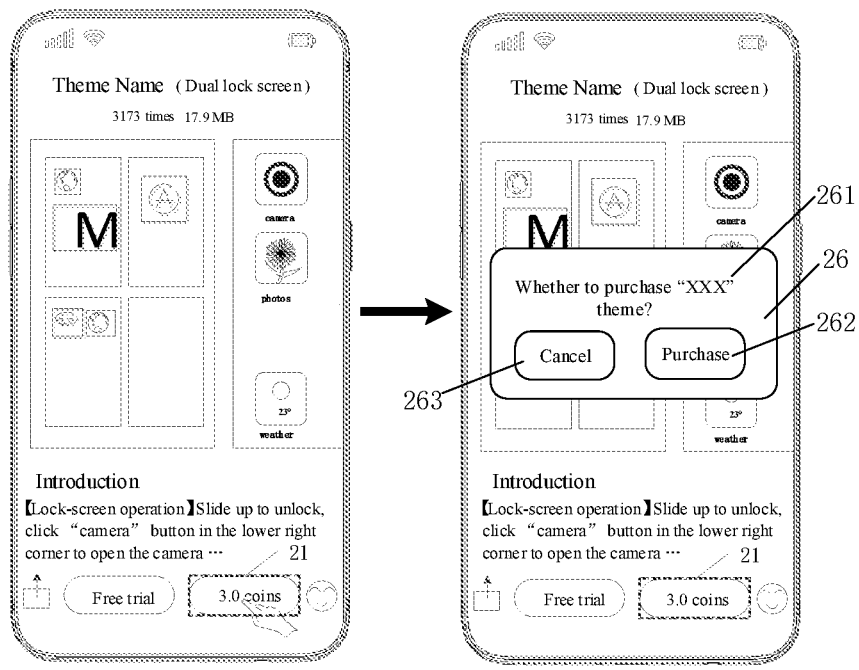
FIG. 7 is a schematic diagram illustrating interfaces based on the method for fingerprint recognition described in conjunction with FIG. 2 according to embodiments.

FIG. 7 is a schematic diagram illustrating interfaces based on the method for fingerprint recognition described in conjunction with FIG. 2 according to embodiments. As illustrated in FIG. 7, when fingerprint information on the display area 21 displaying the specified function widget is collected and security verification of the fingerprint information passes, the terminal detects whether a final position touched via the touch operation falls into the display area 21 displaying the specified function widget. If a finger of the user is lifted after a long-press on the display area 21 displaying the specified function widget, the terminal determines that the final position touched via the touch operation falls into the display area 21 displaying the specified function widget. In this case, the terminal displays a confirmation popup window 26 on a current user interface, and confirmation prompt information 261 (i.e., "Are you sure to purchase 'XXX' theme?") is displayed in the confirmation popup window 26. When a confirmation button 262 is clicked, the terminal determines that the user wants to purchase the 'XXX' theme and performs operations of purchasing the "XXX" theme. When a cancel button 263 is clicked, the terminal determines that the user does not want to purchase the "XXX" theme and hides the confirmation popup window 26.

As can be seen, in the first application scenario, the terminal can complete operations of verifying user identity without the user's awareness, and can avoid triggering the function of the specified function widget (e.g., a purchase function) accidentally.

The second application scenario is as follows.

(1) When the security verification of the fingerprint information passes, whether the touch operation is a first sliding operation is detected.

In some embodiments, a start position touched via the first sliding operation is within the display area displaying the specified function widget, and a final position touched via the first sliding operation is within a first target area. The first target area is a closed area of the current display interface of the terminal and the first target area does not belong to the display area displaying the specified function widget.

In these embodiments, after the terminal completes the operation (1), the terminal may select to perform an operation (2) or operation (3) according to a detection result.

(2) Upon detecting that the touch operation is the first sliding operation, the function of the specified function widget is triggered.

According to embodiments, if the touch operation is the first sliding operation, a start position touched via the touch operation is within the display area displaying the specified function widget, and a final position touched via the touch operation is within the first target area. It should be noted that, the first target area may be a highlighted area. As an example, the first target area may be an area displaying a button. As another example, prompt text may be displayed on the first target area (e.g., "Slide hereto to decrypt and open file A"), where the function of the specified function widget is embodied as a function of decrypting and opening of file A.

(3) Upon detecting that the touch operation is a second sliding operation, the fingerprint sensor is disabled.

In some embodiments, a start position touched via the second sliding operation is within the display area displaying the specified function widget, and a final position touched via the second sliding operation is within a second target area. The second target area is connected to or separated from the display area displaying the specified function widget and the first target area.

Figure 8:
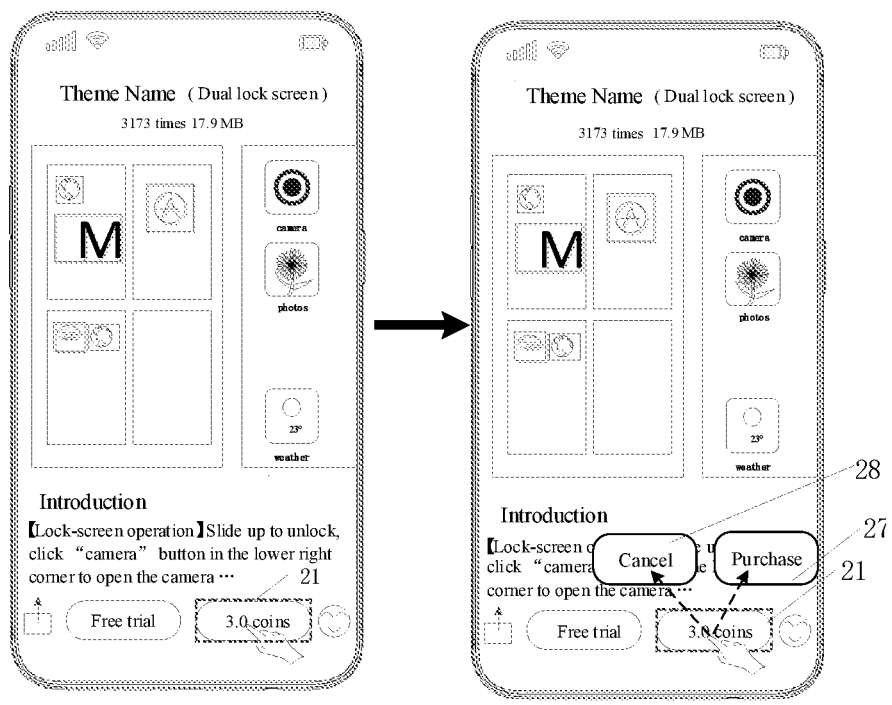
FIG. 8 is a schematic diagram illustrating interfaces based on the method for fingerprint recognition described in conjunction with FIG. 2 according to other embodiments.

FIG. 8 is a schematic diagram illustrating interfaces based on the method for fingerprint recognition described in conjunction with FIG. 2 according to other embodiments. As illustrated in FIG. 8, if security verification of fingerprint information collected by the terminal passes, the terminal detects whether a touch operation of the user performed on the display area 21 displaying the specified function widget is the first sliding operation. If the touch operation of the user is a sliding operation, a start position touched via the touch operation is within the display area 21 displaying the specified function widget, and a final position touched via the touch operation is within a first target area 27, the touch operation is determined to be the first sliding operation.

According to embodiments, upon detecting that the touch operation is the first sliding operation, the function of the specified function widget can be triggered. For instance, if the user's touch operation is that a finger moves to the first target area 27 and then leaves the first target area 27 after a long-press on the display area 21, the terminal deducts 3.0 coins of a current user account to purchase a "XXX" theme.

According to embodiments, upon detecting that the touch operation is the second sliding operation, the fingerprint sensor can be disabled. For example, when the terminal detects that the touch operation is a sliding operation that a finger moves to the second target area and then leaves the second target area after a long-press on the display area 21, the terminal determines that the touch operation is the second sliding operation and disables the fingerprint sensor.

In one possible application scenario, the second target area is separated from or connected to the display area displaying the specified function widget and the first target area.

In another possible application scenario, the second target area may be a specified area, such as a second target area 28 illustrated in FIG. 8.

In some embodiments, each of the first target area and the second target area may refer to an area used for displaying corresponding text after the security verification of the fingerprint information passes. For example, text such as "purchase", "confirm", "decrypt", or the like may be displayed on the first target area, and text such as "cancel", "stop", "reject", or the like may be displayed on the second target area.

As can be seen, in the second application scenario, a situation where the terminal performs the function of the specified function widget in response to an accidental operation (i.e., the user performs a long-press on an area displaying the specified function widget accidentally) can be avoided.

The third application scenario is as follows.

(1) When the security verification of the fingerprint information passes, an image is collected with a front camera of the terminal.

According to embodiments, if the security verification of the fingerprint information passes, the terminal collects the image with the front camera of the terminal. The image collected by the front camera may or may not contain a face.

(2) When the image collected contains a face and the face and the fingerprint information belong to a same user, the function of the specified function widget is triggered.

According to embodiments, when the image collected contains a face and the face and the fingerprint information belong to a same user, the terminal triggers the function of the specified function widget. The terminal may store a correspondence between faces and different user identities in advance and store another correspondence between fingerprint information and different user identities in advance.

As can be seen, in the third application scenario, the terminal can avoid a situation where someone other than the user can trigger the function of the specified function widget once fingerprint verification passes, thereby increasing possibility of triggering the function of the specified function widget according to the user's wishes.

According to embodiments, when the touch operation performed on the specified function widget of the current display interface of the terminal is detected and the duration of the touch operation reaches the preset duration, it indicates that the function of the specified function widget needs to be decrypted to achieve the function. To this end, the fingerprint sensor disposed under the display area displaying the specified function widget is activated, the fingerprint information corresponding to the touch operation is collected with the fingerprint sensor, and the security verification is performed on the fingerprint information. If the security verification of the fingerprint information passes, it indicates that a current decryption operation is safe. In this case, the function of the specified function widget is triggered, so that efficiency of decrypting the function can be improved.

Figure 9:
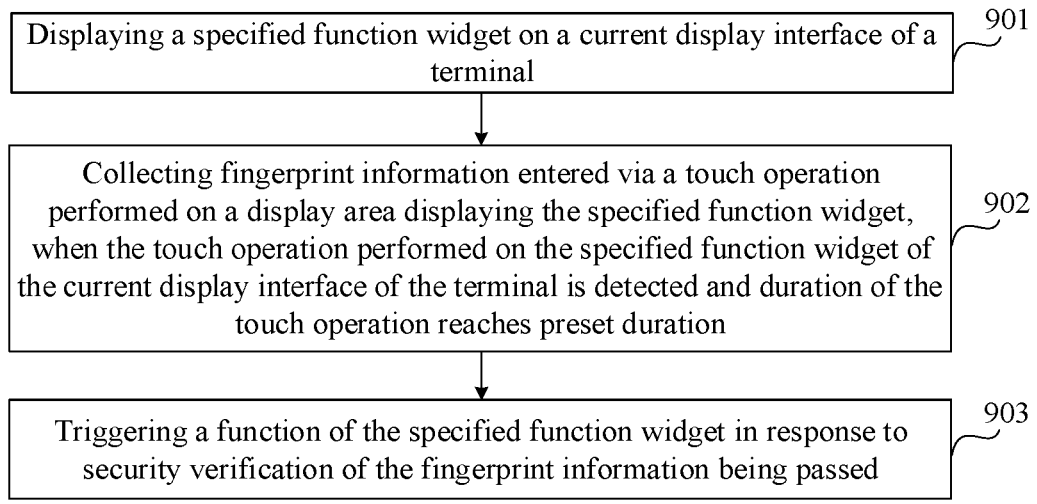
FIG. 9 is a schematic diagram illustrating a method for fingerprint recognition according to embodiments.

FIG. 9 is a schematic diagram illustrating a method for fingerprint recognition according to embodiments. The method is applicable to a terminal (e.g., the foregoing terminal) and includes the following.

At block 901, a specified function widget is displayed on a current display interface of the terminal.

According to embodiments, the terminal can display the specified function widget on the current display interface of the terminal. In one possible embodiment, the terminal displays the specified function widget via a third-party application. In another possible embodiment, the terminal displays the specified function widget on a desktop of the terminal.

It should be noted that, the specified function widget can be embodied as different forms according to different scenarios.

In some embodiments, the current display interface of the terminal is embodied as the desktop of the terminal, the specified function widget may be an activation widget of a specified application, and the activation widget herein is referred to as an activation icon.

In some embodiments, the current display interface of the terminal is embodied as a user interface of a third-party application, the specified function widget may be an activation widget of a specified function (e.g., an opening widget for opening a document, a picture, a video, an audio, or the like). In some embodiments, the specified function widget may be a payment widget for paying fees.

At block 902, when a touch operation performed on the specified function widget of the current display interface of the terminal is detected and duration of the touch operation reaches preset duration, fingerprint information entered via the touch operation performed on a display area displaying the specified function widget is collected.

According to embodiments, when the touch operation performed on the specified function widget of the current display interface of the terminal is detected and the duration of the touch operation reaches the preset duration, the terminal collects the fingerprint information entered via the touch operation performed on the display area displaying the specified function widget. In one possible embodiment, the terminal activates all fingerprint sensors under the whole screen of the terminal in advance, when a touch operation performed on the specified function widget and lasting for a time period longer than the preset duration is detected, fingerprint information entered via the touch operation is collected on the display area displaying the specified function widget.

At block 903, when security verification of the fingerprint information passes, a function of the specified function widget is triggered For details of the operations at block 903, reference can be made to the operations at block 104, and it will not be repeated herein.

According to embodiments, the terminal can display the specified function widget on the current display interface of the terminal. When the touch operation performed on the specified function widget of the current display interface is detected and the duration of the touch operation reaches the preset duration, the fingerprint information corresponding to the touch operation can be collected on the display area displaying the specified function widget. When the security verification of the fingerprint information passes, the function of the specified function widget is triggered. As such, interaction efficiency between the user and the terminal can be improved while ensuring security of information and functions of the terminal.

Figure 10:
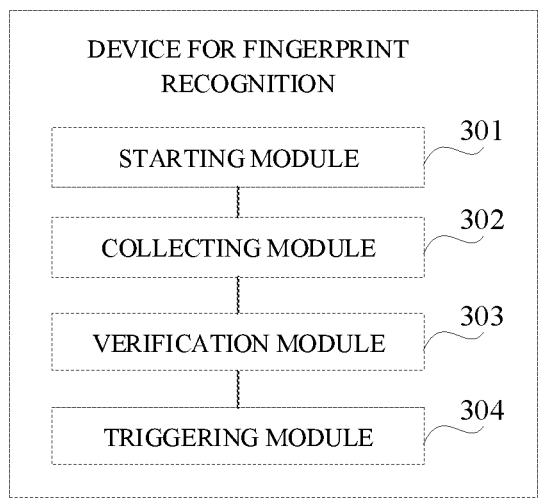
FIG. 10 is a schematic structural diagram illustrating a device for fingerprint recognition according to embodiments.

As illustrated in FIG. 10, a device for fingerprint recognition is provided according to embodiments. The device may be implemented by software, hardware, or a combination of the two. The device is configured in a terminal (e.g., the foregoing terminal). The device includes a starting module 301, a collecting module 302, a verification module 303, and a triggering module 304. The starting module 301 is configured to activate a fingerprint sensor disposed under a display area displaying a specified function widget, when a touch operation performed on the specified function widget of a current display interface of the terminal is detected and duration of the touch operation reaches preset duration. The collecting module 302 is configured to collect, with the fingerprint sensor, fingerprint information entered via the touch operation. The verification module 303 is configured to perform security verification on the fingerprint information. The triggering module 304 is configured to trigger a function of the specified function widget when the security verification of the fingerprint information passes.

In some embodiments, the verification module 303 is configured to determine that that the security verification of the fingerprint information passes when the fingerprint information is identical with valid fingerprint information stored in advance. The verification module 303 is configured to determine that the security verification of the fingerprint information fails when the fingerprint information is different from the valid fingerprint information stored in advance.

Figure 11:
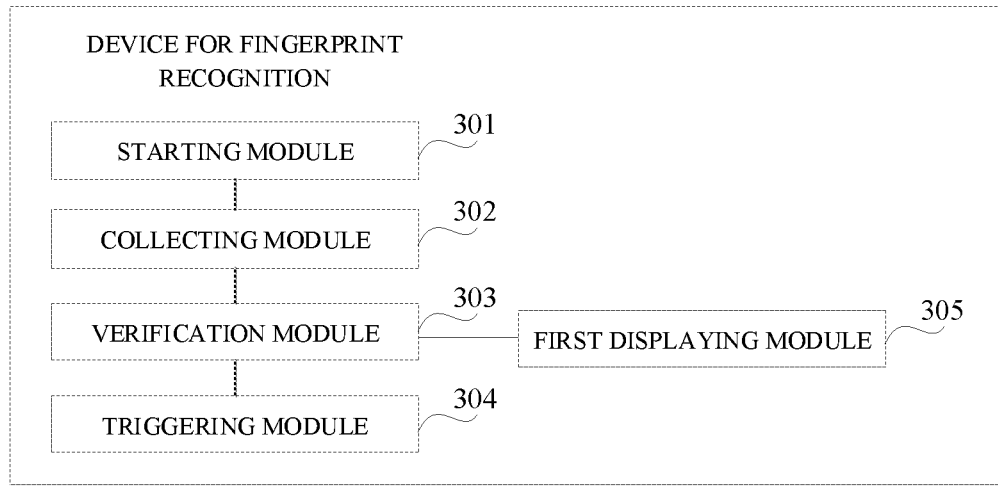
FIG. 11 is a schematic structural diagram illustrating a device for fingerprint recognition according to other embodiments.

In some embodiments, as illustrated in FIG. 11, the device for fingerprint recognition further includes a first displaying module 305. The first displaying module 305 is configured to display fingerprint-entering prompt information on the current display interface, where the fingerprint-entering prompt information is used for prompting a user to re-enter a fingerprint.

Figure 12:
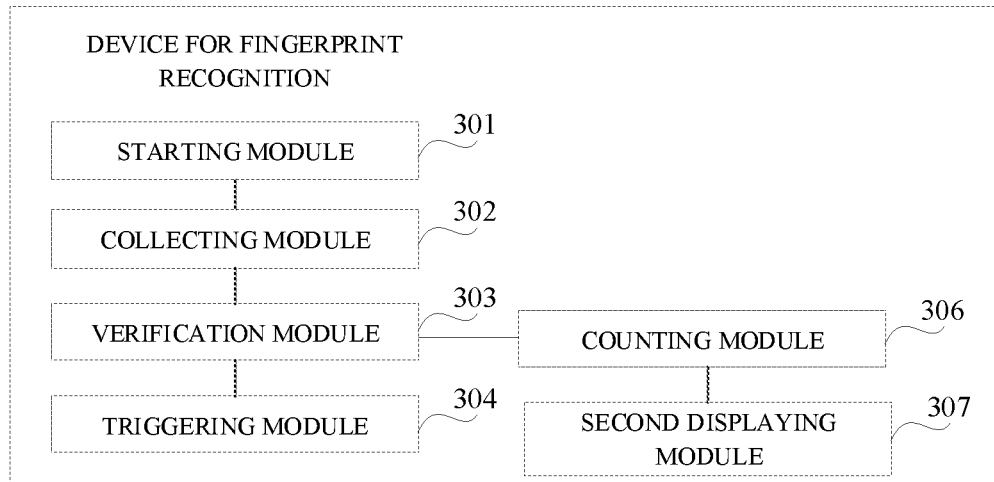
FIG. 12 is a schematic structural diagram illustrating a device for fingerprint recognition according to other embodiments.

In some embodiments, as illustrated in FIG. 12, the device for fingerprint recognition further includes a counting module 306 and a second displaying module 307. The counting module 306 is configured to count the number of recognition failures, where the number of recognition failures is the number of consecutive fingerprint recognition failures. The second displaying module 307 is configured to display a password entering interface on the current display interface to prompt a user to enter a password via the password entering interface, when the number of recognition failures reaches a preset number.

Figure 13:
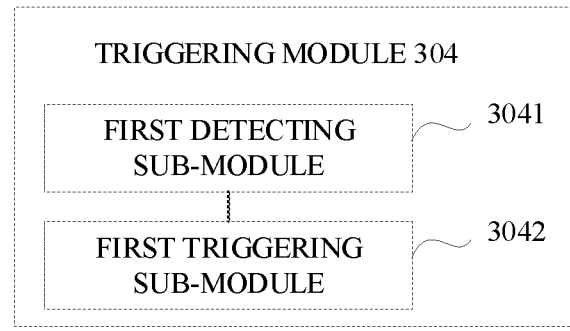
FIG. 13 is a schematic structural diagram illustrating a device for fingerprint recognition according to other embodiments.

In some embodiments, as illustrated in FIG. 13, the triggering module 304 includes a first detecting sub-module 3041 and a first triggering sub-module 3042. The first detecting sub-module 3041 is configured to detect whether the touch operation is a first sliding operation when the security verification of the fingerprint information passes, where a start position touched via the first sliding operation is within the display area displaying the specified function widget, and a final position touched via the first sliding operation is within a first target area (where the first target area is a closed area of the current display interface of the terminal and the first target area does not belong to the display area displaying the specified function widget). The first triggering sub-module 3042 is configured to trigger the function of the specified function widget, upon detecting that the touch operation is the first sliding operation.

In some embodiments, the device for fingerprint recognition further includes a disabling module. The disabling module is configured to disable the fingerprint sensor upon detecting that the touch operation is a second sliding operation, where a start position touched via the second sliding operation is within the display area displaying the specified function widget, and a final position touched via the second sliding operation is within a second target area (where the second target area does not belong to (i.e., is not within) the display area displaying the specified function widget and the first target area).

Figure 14:
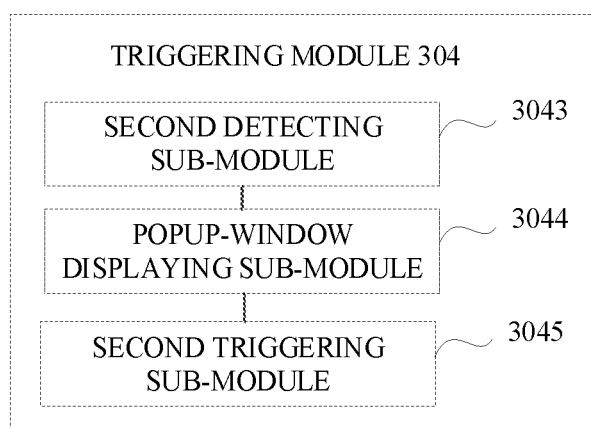
FIG. 14 is a schematic structural diagram illustrating a device for fingerprint recognition according to other embodiments.

In some embodiments, as illustrated in FIG. 14, the triggering module 304 includes a second detecting sub-module 3043, a popup-window displaying sub-module 3044, and a second triggering sub-module 3045. The second detecting sub-module 3043 is configured to detect whether a final position touched via the touch operation falls into the display area displaying the specified function widget, when the security verification of the fingerprint information passes. The popup-window displaying sub-module 3044 is configured to display a confirmation popup window on a current user interface, upon detecting that the final position touched via the touch operation falls into the display area displaying the specified function widget, where the confirmation popup window includes a confirmation button and confirmation prompt information, and the confirmation prompt information is used for informing a user of that the security verification passes and querying whether to trigger the function of the specified function widget. The second triggering sub-module 3045 is configured to trigger the function of the specified function widget when the confirmation button is clicked.

Figure 15:
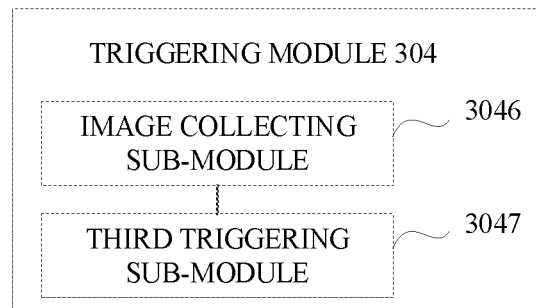
FIG. 15 is a schematic structural diagram illustrating a device for fingerprint recognition according to other embodiments.

In some embodiments, as illustrated in FIG. 15, the triggering module 304 includes an image collecting sub-module 3046 and a third triggering sub-module 3047. The image collecting sub-module 3046 is configured to collect an image with a front camera of the terminal when the security verification of the fingerprint information passes. The third triggering sub-module 3047 is configured to trigger the function of the specified function widget, when the image collected contains a face and the face and the fingerprint information belong to a same user.

According to embodiments, when the touch operation performed on the specified function widget of the current display interface of the terminal is detected and the duration of the touch operation reaches the preset duration, it indicates that the function of the specified function widget needs to be decrypted to achieve the function. To this end, the fingerprint sensor at the display area of the specified function widget is activated and the fingerprint information corresponding to the touch operation is collected with the fingerprint sensor. The security verification is performed on the fingerprint information. If the security verification of the fingerprint information passes, a current decryption operation is determined to be safe, and the function of the specified function widget is triggered. In this way, efficiency of decrypting of the function can be improved.

Figure 16:
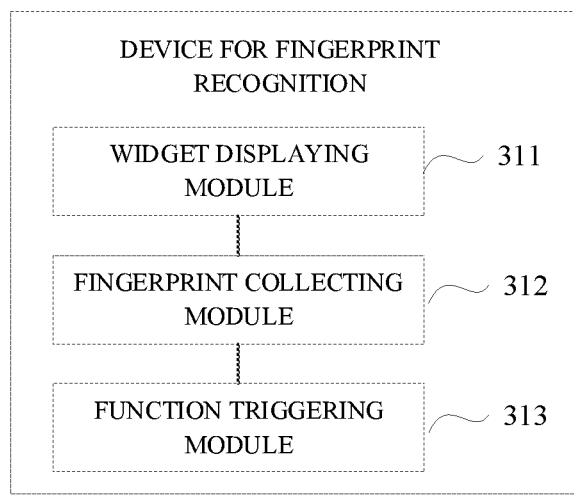
FIG. 16 is a schematic structural diagram illustrating a device for fingerprint recognition according to other embodiments.

FIG. 16 is a schematic structural diagram illustrating a device for fingerprint recognition according to other embodiments. The device may be implemented by software, hardware, or a combination of the two. The device is configured in a terminal (e.g., the foregoing terminal). The device includes a widget displaying module 311, a fingerprint collecting module 312, and a function triggering module 313. The widget displaying module 311 is configured to display a specified function widget on a current display interface of the terminal. The fingerprint collecting module 312 is configured to collect fingerprint information entered via a touch operation performed on a display area displaying the specified function widget, when the touch operation performed on the specified function widget of the current display interface is detected and duration of the touch operation reaches preset duration. The function triggering module 313 is configured to trigger a function of the specified function widget when the security verification of the fingerprint information passes.

For details, reference may be made to the related descriptions in the foregoing method embodiments described in conjunction with in FIG. 1 to FIG. 9. The widget displaying module 311 is configured to achieve any functions related to widget-displaying operations which is implicitly or explicitly disclosed in the foregoing method embodiments. The fingerprint collecting module 312 is configured to achieve any functions related to fingerprint-collecting operations which is implicitly or explicitly disclosed in the foregoing method embodiments. The function triggering module 313 is configured to achieve any functions related to function-triggering operations which is implicitly or explicitly disclosed in the foregoing method embodiments.

According to the device for fingerprint recognition provided in the foregoing embodiments for implementing the method for fingerprint recognition, it should be noted that, the division of the above functional modules are merely illustrative. In practice, the above functions may be allocated by different functional modules as required. That is, the internal structure of the device can be divided into different functional modules to implement all or part of the functions described above. In addition, the device for fingerprint recognition and the method for fingerprint recognition provided by the foregoing embodiments belong to the same concept, the example implementation process will not be detailed herein and reference may be made to the foregoing method embodiments.

Figure 17:
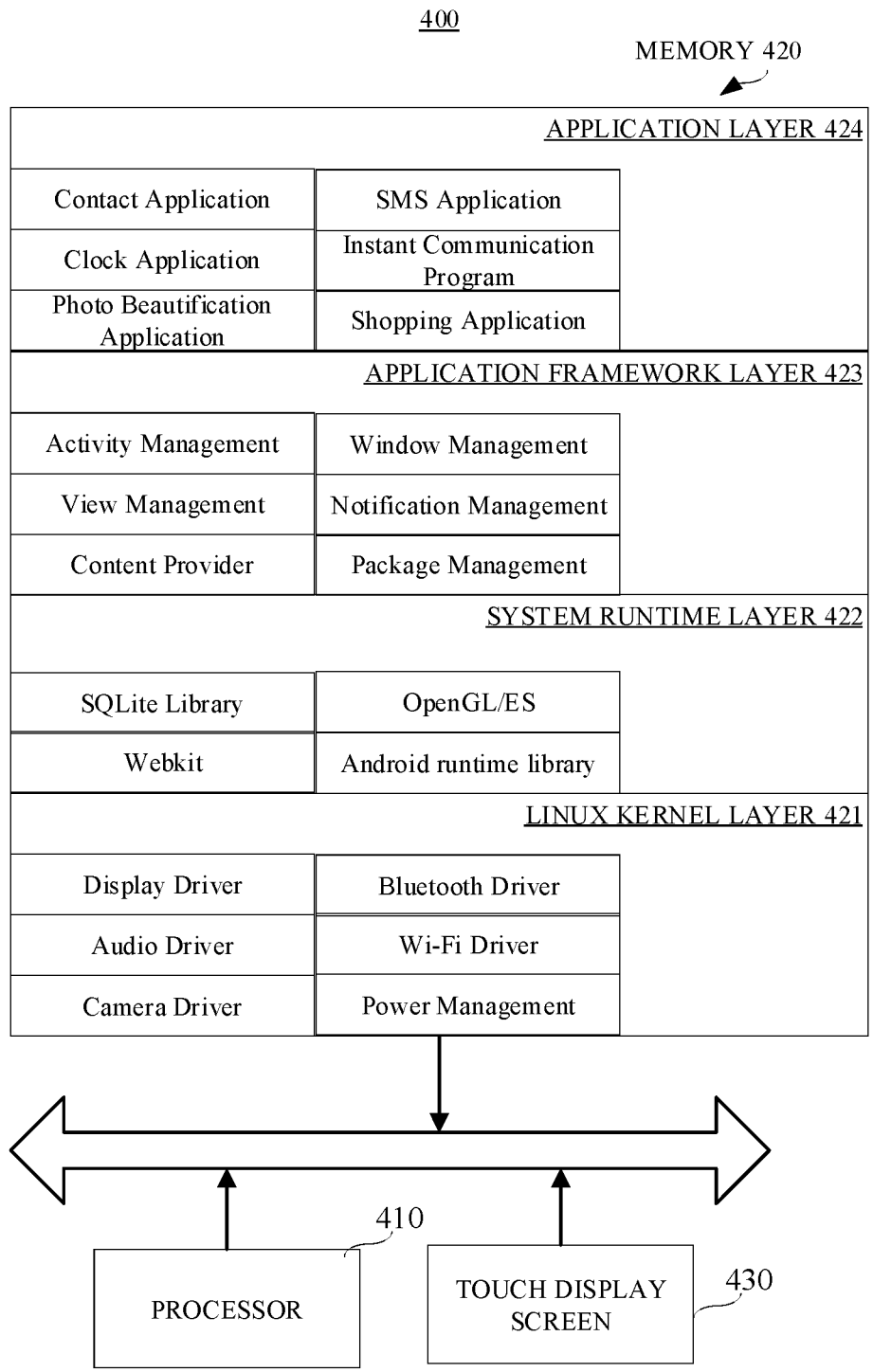
FIG. 17 is a block diagram illustrating a terminal 400 according to embodiments.
Figure 18:
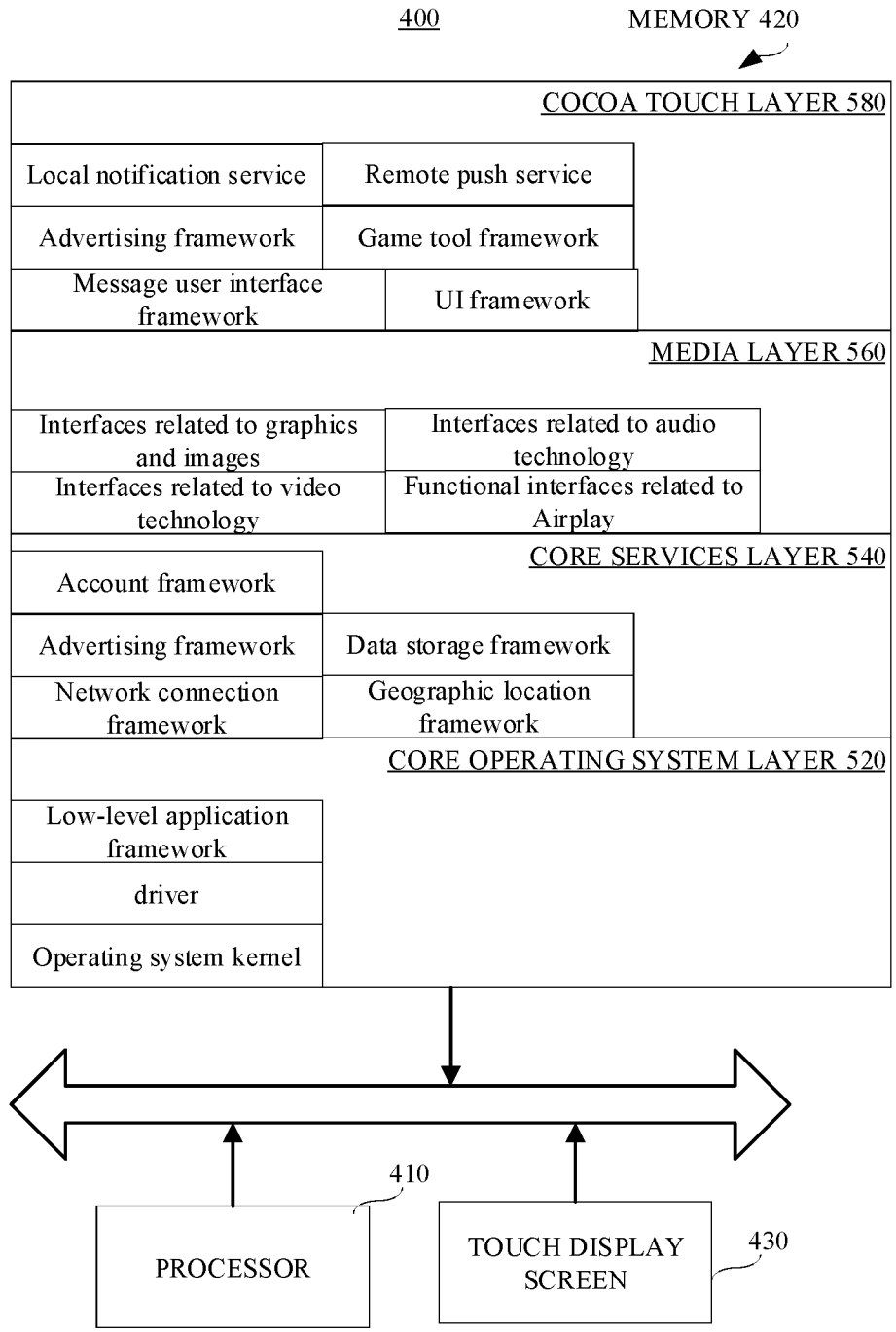
FIG. 18 is a block diagram illustrating a terminal 400 according to other embodiments.

FIG. 17 and FIG. 18 are block diagrams illustrating a terminal 400 according to example embodiments. The terminal 400 may include the device for fingerprint recognition illustrated in FIG. 10 to FIG. 16. The terminal 400 may be a mobile phone, a tablet computer, a notebook computer, an e-book, or the like. The terminal 400 of the disclosure includes one or more of processors 410, memories 420, and touch display screens 430.

The processor 410 may include one or more processing cores. The processor 410 couples various parts of the entire terminal 400 by using various interfaces and lines. The processor 410 is configured to execute various functions of the terminal 400 and process data by running or executing instructions, programs, code sets, or instruction sets stored in the memory 420 and calling data stored in the memory 420. In some embodiments, the processor 410 may be implemented using at least one of the following hardware: digital signal processing (DSP), field-programmable gate array (FPGA), and programmable logic array (PLA). In some embodiments, the processor 410 integrates one or a combination of a central processing unit (CPU), a graphics processing unit (GPU), and a modem. The CPU is mainly configured to process an operating system, a user interface, application programs, and so on. The GPU is responsible for rendering and drawing of contents to be displayed on the touch display screen 430. The modem is configured to process wireless communication. In some embodiments, the modem may not be integrated with the processor 410 and may be embodied as a single chip.

The memory 420 may include a random access memory (RAM), and may also include a read-only memory (ROM). In some embodiments, the memory 420 includes a non-transitory computer-readable storage medium. The memory 420 is configured to store instructions, programs, codes, code sets, instruction sets, or the like. The memory 420 may include a program storage area and a data storage area. The program storage area may store instructions required for implementing an operating system, instructions required for at least one function (e.g., a touch function, a sound playback function, an image playback function, etc.), and instructions required for implementing the foregoing method embodiments. The data storage area may store data (e.g., audio data, phone book, and the like) created according to the use of the terminal 400.

Taking the Android® system as an example of the operating system, programs and data stored in the memory 420 are illustrated in FIG. 17. The memory 420 is configured to store a Linux kernel layer 421, a system runtime layer 422, an application framework layer 423, and an application layer 424. The Linux kernel layer 421 provides low-level drivers for various hardware of the terminal 400, such as a display driver, an audio driver, a camera driver, a Bluetooth driver, a Wi-Fi driver, and power management. The system runtime layer 422 provides major feature support for the Android® system through some C/C++ libraries. For example, the SQLite library provides database support, the OpenGL/ES library provides 3D drawing support, and the Webkit library provides browser kernel support. The Android® runtime library is also provided in the system runtime layer 422, the Android® runtime library mainly provides some core libraries, which can allow developers to use the Java language to write Android® applications. The application framework layer 423 provides various APIs that may be used when building applications. Developers can also use these APIs to build their own applications, such as activity management, window management, view management, notification management, content providers, package management, call management, resource management, location management. The application layer 424 includes at least one application, and the at least one application may be applications that are native to the operating system (e.g., contact applications, SMS applications, clock applications, camera applications, etc.), and may also be applications developed by third-party developers (e.g., instant communication applications, photo beautification programs, and so on).

Taking the IOS® system as an example of the operating system, programs and data stored in the memory 420 are illustrated in FIG. 18. The IOS® system includes a core operating system layer 520 (i.e., Core OS layer), a core services layer 540, a media layer 560, and a cocoa touch layer 580. The core operating system layer 520 includes an operating system kernel, drivers, and a low-level application framework. These low-level application frameworks provide functions closer to hardware for use by an application framework located at the core services layer 540. The core services layer 540 provides system services and/or application frameworks required by applications, such as a foundation framework, an account framework, an advertising framework, a data storage framework, a network connection framework, a geographic location framework, a motion framework, and so on. The media layer 560 provides audio-visual-related interfaces for applications, such as interfaces related to graphics and images, interfaces related to audio technology, interfaces related to video technology, and wireless playback (i.e., AirPlay) interfaces for audio and video transmission technologies. The cocoa touch layer 580 provides various commonly-used interface-related frameworks for application development. The cocoa touch layer 580 is responsible for touch interaction operations of a user on the terminal 400. For example, a local notification service, a remote push service, an advertising framework, a game tool framework, a message user interface (UI) framework, a user interface (e.g., UIKit) framework, a map framework, and so on.

Among the frameworks illustrated in FIG. 18, frameworks related to most applications include, but are not limited to, the foundation framework of the core services layer 540 and the UIKit framework of the cocoa touch layer 580. The foundation framework provides many basic object classes and data types, and provides the most basic system services for all applications, regardless of the UI. Classes provided by the UIKit framework are basic UI class libraries for creating touch-based user interfaces. IOS® applications can provide UIs based on the UIKit framework, so the UIKit framework provides application's infrastructure for building user interfaces, drawing, handling and user interaction events, responding to gestures, and so on.

The touch display screen 430 is configured to receive a touch operation by a user using a finger, a touch pen, or any suitable object on or nearby, and to display user interfaces of various applications. The touch display screen 430 is usually disposed on a front panel of the terminal 400. The touch display screen 430 may be designed as a full screen, a curved screen, or a special-shaped screen. The touch display screen 430 may also be designed as a combination of a full screen and a curved screen, and a combination of a special-shaped screen and a curved screen, which is not limited herein.

Full Screen

Figure 19:
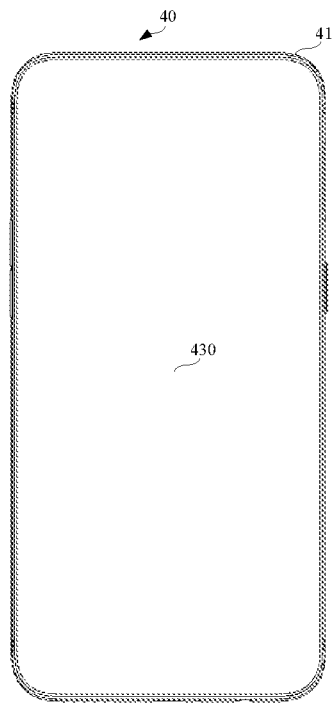
FIG. 19 is a schematic diagram illustrating an interface displayed on a full screen according to embodiments.

The full screen refers to a screen design in which the touch display screen 430 occupies the front panel of the terminal 400 with a screen ratio (i.e., screen-to-body ratio) exceeding a threshold (e.g., 80%, 90%, or 95%). As an example, the screen-to-body ratio is calculated as follows: (the area of the touch display screen 430/the area of the front panel of the terminal 400)*100%. As another example, the screen-to-body ratio is calculated as follows: (the actual display area of the touch display screen 430/the area of the front panel of the terminal 400)*100%. As still another example, the screen-to-body ratio is calculated as follows: (the diagonal of the touch display screen 430/the diagonal of the front panel of the terminal 400)*100%. For instance, as illustrated in FIG. 19, almost all areas on the front panel of the terminal 400 are the touch display screen 430. For a front panel 40 of the terminal 400, areas other than edge areas generated by a middle frame 41 are all the touch display screen 430. Four corners of the touch display screen 430 may be right-angled or rounded.

The full screen may also be a screen design in which at least one front panel component is integrated inside or below the touch display screen 430. In some embodiments, the at least one front panel component includes a camera, a fingerprint sensor, a proximity light sensor, a distance sensor, and the like. In some embodiments, other components disposed on the front panel of the traditional terminal are integrated in entire or part area of the touch display screen 430. For example, photosensitive element of the camera is divided into multiple photosensitive pixels, each of the photosensitive pixels is integrated with a black area of each display pixel of the touch display screen 430. Since the at least one front panel component is integrated inside the touch display screen 430, the full screen has a relatively high screen-to-body ratio.

In other embodiments, front panel components disposed on the front panel of the traditional terminal can also be set on the side or back of the terminal 400. For example, an ultrasonic fingerprint sensor is disposed under the touch display screen 430, a bone-conducting handset is disposed inside the terminal 400, and a camera is disposed on one side of the terminal and has a pluggable structure.

In some possible embodiments, the terminal 400 is configured with a full screen, one side, two sides (e.g., left and right sides), or four sides (e.g., upper, lower, left, and right sides) of the middle frame of the terminal 400 may be provided with edge touch sensor(s). The edge touch sensor is configured to detect at least one of a touch operation, a click operation, a pressing operation, and a sliding operation of a user on the middle frame. The edge touch sensor may be any one of a touch sensor, a thermal sensor, and a pressure sensor. The user can control an application of the terminal 400 by applying an operation to the edge touch sensor.

Curved Screen

Figure 20:
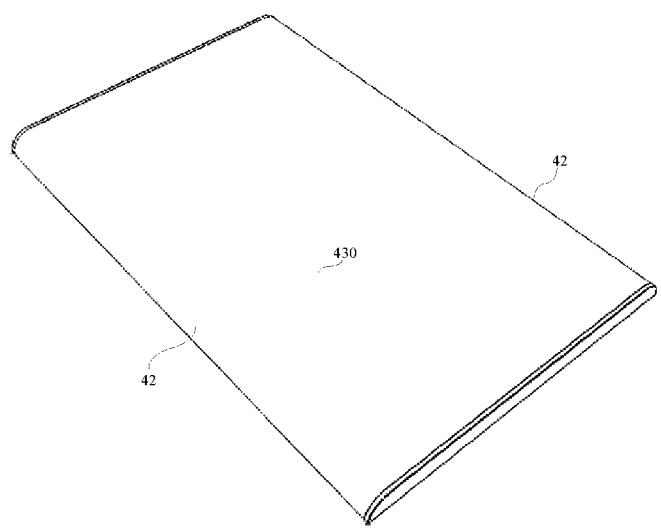
FIG. 20 is a schematic diagram illustrating an interface displayed on a curved screen according to embodiments.

The curved screen refers to a screen design in which areas of the touch display screen 430 are not in a same plane. Generally, the curved screen has at least one cross section: the cross section has a curved shape, and the projection of the curved screen in any plane direction perpendicular to the cross section is a plane, where the curved screen may be U-shaped. In some embodiments, the curved screen refers to a screen design in which at least one side is a curved shape. In some embodiments, the curved screen refers to a screen design in which at least one side of the touch display screen 430 extends to cover the middle frame of the terminal 400. Since the side of the touch display screen 430 extends to cover the middle frame of the terminal 400, the middle frame that originally did not have a display function and a touchable function is also covered as a display area and/or an operable area. As such, the curved screen can have a relatively high screen-to-body ratio. In some embodiments, as illustrated in FIG. 20, the curved screen refers to a screen design in which the left and right sides 42 are curved, a screen design in which the upper and lower sides are curved, or a screen design in which the top, bottom, left, and right sides are curved. In some possible embodiments, the curved screen is made of touch screen materials with a certain flexibility.

Special-Shape Screen

The special-shaped screen refers to a touch display screen with an irregular appearance. The irregular appearance do not include a rectangular shape or a rounded rectangular shape. In some embodiments, the special-shaped screen refers to a screen design in which the rectangular or rounded rectangular touch display screen 430 is provided with protrusions, notches, and/or holes. In some embodiments, the protrusions, notches, and/or holes are disposed on the edge, the center, or both of the edge and the center of the touch display screen 430. As an example, the protrusions, notches, and/or holes are disposed on one edge of the touch display screen 430, the protrusions, notches, and/or holes may be located at a middle position or both ends of the edge. As another example, the protrusions, notches, and/or holes are disposed on the center of the touch display screen 430, the protrusions, notches, and/or holes may be disposed on one or more areas, such as the upper area, the upper left area, the left area, the lower left area, the lower area, the lower right area, the right area, and the upper right area of the touch display screen 430. As still another example, the protrusions, notches, and/or holes are located at different areas. The protrusions, notches, and/or holes may be distributed in a centralized or distributed manner. The protrusions, notches, and/or holes may be distributed symmetrically or asymmetrically. In some embodiments, the number of the protrusions, notches, and/or holes is not limited herein.

The special-shaped screen covers an upper and/or lower forehead area of the touch display screen as a display area and/or an operable area, so that the touch display screen occupies more space on the front panel of the terminal. As such, the special-shaped screen also has a relatively high screen-to-body ratio. In some embodiments, the notches, and/or holes are used to receive at least one front panel component. The at least one front panel component includes, but is not limited to, a camera, a fingerprint sensor, a proximity light sensor, a distance sensor, a handset, an ambient light sensor, and a physical button.

Figure 21:
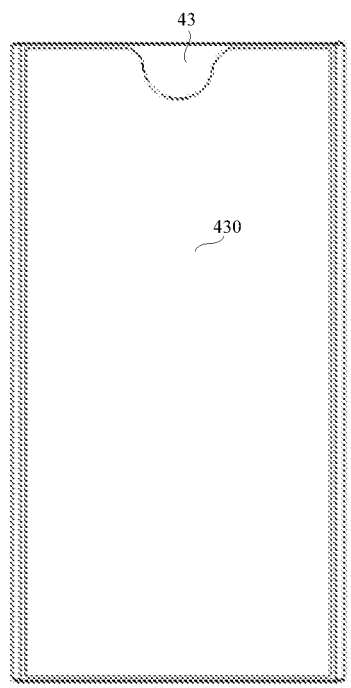
FIG. 21 is a schematic diagram illustrating an interface displayed on a special-shaped screen according to embodiments.
Figure 22:
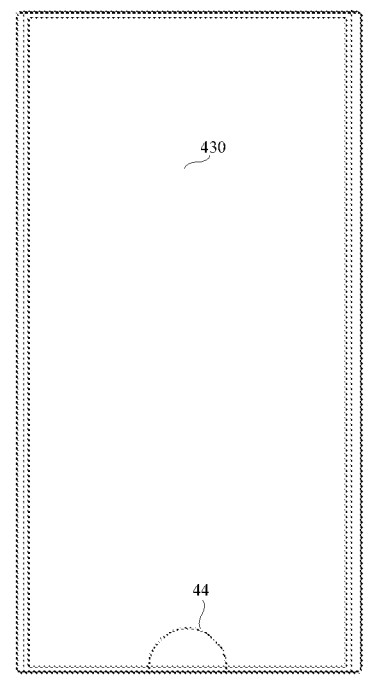
FIG. 22 is a schematic diagram illustrating an interface displayed on a special-shaped screen according to other embodiments.
Figure 23:
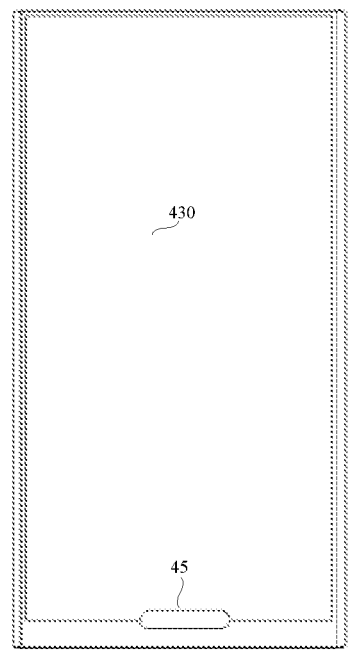
FIG. 23 is a schematic diagram illustrating an interface displayed on a special-shaped screen according to other embodiments.
Figure 24:
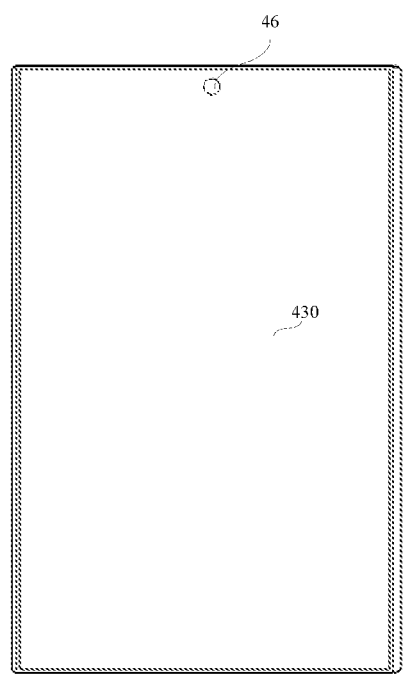
FIG. 24 is a schematic diagram illustrating an interface displayed on a special-shaped screen according to other embodiments.

For example, the notches are disposed on one or more edges. The notch may be a semi-circular notch, a right-angled rectangular notch, a rounded rectangular notch, or an irregularly-shaped notch. As illustrated in FIG. 21, the special-shaped screen is a screen provided with a semi-circular notch 43 on the center of the upper edge of the touch display screen 430. The space vacated by the semi-circular notch 43 is used to accommodate at least one front panel component such as a camera, a distance sensor (also known as a proximity sensor), a handset, and an ambient light sensor. As illustrated in FIG. 22, the special-shaped screen is a screen provided with a semi-circular notch 44 on the center of the lower edge of the touch display screen 430. The space vacated by the semi-circular notch 44 is used to accommodate at least one component such as a physical button, a fingerprint sensor, and a microphone. As illustrated in FIG. 23, the special-shaped screen is a screen provided with a semi-elliptical notch 45 on the center of the lower edge of the touch display screen 430, and another semi-elliptical notch is provided on the front panel of the terminal 400, the two semi-elliptical notches form an elliptical area used to accommodate a physical key or a fingerprint recognition module. As illustrated in FIG. 24, the special-shaped screen is a screen provided with at least one small hole 46 on the upper half of the touch display screen 430. The space vacated by the hole 46 is used to accommodate front panel components such as a camera, a distance sensor, a handset, and an ambient light sensor.

Those skilled in the art can understand that the structure of the terminal 400 illustrated in foregoing accompanying drawings does not constitute any limitation on the terminal 400. The terminal configured to implement technical solutions of the disclosure may include more or fewer components than illustrated, or may combine certain components or different components. For example, the terminal 400 further includes components such as a radio frequency circuit, an input unit, a sensor, an audio circuit, a wireless fidelity (Wi-Fi) module, a power supply, and a Bluetooth module, which are not be repeated herein.

A terminal is provided. The terminal includes at least one processor and a computer readable storage. The computer readable storage is coupled to the at least one processor and stores at least one computer executable instruction thereon which, when executed by the at least one processor, is operable with the at least one processor to execute the operations of any of the foregoing method embodiments.

A non-transitory computer-readable storage medium is provided. Instructions in the non-transitory computer-readable storage medium, when executed by a processor of a terminal, are operable with the terminal to execute the foregoing methods for fingerprint recognition illustrated in FIG. 1, FIG. 2, or FIG. 9.

A computer program product is provided. The computer program product includes instructions, when executed by a computer, are operable with the computer to execute the foregoing methods for fingerprint recognition illustrated in FIG. 1, FIG. 2, or FIG. 9.

Those of ordinary skill in the art may understand that implementing all or part of the operations in the foregoing embodiments may be accomplished by hardware, or may be accomplished through programs to instruct relevant hardware to complete, and the corresponding programs may be stored in a computer readable storage medium. The storage medium may be a read-only memory, Disk or compact disc (CD), and so on.

The foregoing description merely depicts some example embodiments of the disclosure, which however are not intended to limit the disclosure. Any modifications, equivalent substitutions, or improvements made thereto without departing from the spirits and principles of the disclosure shall all be encompassed within the protection scope of the disclosure.

What is claimed is:

1. A method for fingerprint recognition, the method being applicable to a terminal, the terminal comprising at least one fingerprint sensor disposed under a display screen of the terminal, and the method comprising:

activating a fingerprint sensor disposed under a display area displaying a specified function widget, when a touch operation performed on the specified function widget of a current display interface of the terminal is detected and duration of the touch operation reaches preset duration;

collecting, with the fingerprint sensor, fingerprint information entered via the touch operation;

performing security verification on the fingerprint information;

detecting whether the touch operation is a first sliding operation in response to the security verification of the fingerprint information being passed, wherein the first sliding operation is that a finger moves to a first target area and then leaves the first target area after a long-press on the display area displaying the specified function widget, wherein the first target area is a closed area of the current display interface of the terminal and the first target area is not within the display area displaying the specified function widget; and triggering a function of the specified function widget in response to detecting that the touch operation is the first sliding operation.

2. The method of claim 1, wherein performing the security verification on the fingerprint information comprises:
determining that the security verification of the fingerprint information passes, in response to the fingerprint information being identical with valid fingerprint information stored in advance; and
determining that the security verification of the fingerprint information fails, in response to the fingerprint information being different from the valid fingerprint information stored in advance.

3. The method of claim 2, further comprising:
after determining that the security verification of the fingerprint information fails:
displaying fingerprint-entering prompt information on the current display interface, wherein the fingerprint-entering prompt information is used for prompting a user to re-enter a fingerprint.

4. The method of claim 2, further comprising:
after determining that the security verification of the fingerprint information fails:
counting the number of recognition failures, wherein the number of recognition failures is the number of consecutive fingerprint recognition failures; and
displaying a password entering interface on the current display interface and prompting a user to enter a password via the password entering interface, in response to the number of recognition failures reaching a preset number.

5. The method of claim 1, further comprising:
disabling the fingerprint sensor in response to detecting that the touch operation is a second sliding operation, wherein a start position touched via the second sliding operation is within the display area displaying the specified function widget, and a final position touched via the second sliding operation is within a second target area, wherein the second target area is not within the display area displaying the specified function widget and the first target area.

6. A method for fingerprint recognition, the method being applicable to a terminal and comprising:
displaying a specified function widget on a current display interface of the terminal;
collecting fingerprint information entered via a touch operation performed on a display area displaying the specified function widget, when the touch operation performed on the specified function widget of the current display interface of the terminal is detected and duration of the touch operation reaches preset duration;
detecting whether the touch operation is a first sliding operation in response to security verification of the fingerprint information being passed, wherein the first sliding operation is that a finger moves to a first target area and then leaves the first target area after a long-press on the display area displaying the specified function widget, wherein the first target area is a closed area of the current display interface of the terminal and the first target area is not within the display area displaying the specified function widget; and triggering a function of the specified function widget in response to detecting that the touch operation is the first sliding operation.

7. A terminal, comprising:
at least one processor; and
a computer readable storage, coupled to the at least one processor and storing at least one computer executable instruction thereon which, when executed by the at least one processor, is operable with the at least one processor to:
activate a fingerprint sensor disposed under a display area displaying a specified function widget, when a touch operation performed on the specified function widget of a current display interface of the terminal is detected and duration of the touch operation reaches preset duration, the terminal comprising at least one fingerprint sensor disposed under a display screen of the terminal;
collect, with the fingerprint sensor, fingerprint information entered via the touch operation;
perform security verification on the fingerprint information;
detect whether the touch operation is a first sliding operation in response to the security verification of the fingerprint information being passed, wherein the first sliding operation is that a finger moves to a first target area and then leaves the first target area after a long-press on the display area displaying the specified function widget, wherein the first target area is a closed area of the current display interface of the terminal and the first target area is not within the display area displaying the specified function widget; and
trigger a function of the specified function widget in response to detecting that the touch operation is the first sliding operation.

8. The terminal of claim 7, wherein the at least one computer executable instruction operable with the at least one processor to perform the security verification on the fingerprint information is operable with the at least one processor to:
determine that the security verification of the fingerprint information passes, in response to the fingerprint information being identical with valid fingerprint information stored in advance; and
determine that the security verification of the fingerprint information fails, in response to the fingerprint information being different from the valid fingerprint information stored in advance.

9. The terminal of claim 8, wherein the at least one computer executable instruction is further operable with the processor to:
display fingerprint-entering prompt information on the current display interface, wherein the fingerprint-entering prompt information is used for prompting a user to re-enter a fingerprint.

10. The terminal of claim 8, wherein the at least one computer executable instruction is further operable with the processor to:
count the number of recognition failures, wherein the number of recognition failures is the number of consecutive fingerprint recognition failures; and
display a password entering interface on the current display interface and prompt a user to enter a password via the password entering interface, in response to the number of recognition failures reaching a preset number.

11. The terminal of claim 7, wherein the at least one computer executable instruction is further operable with the processor to:
  disable the fingerprint sensor in response to detecting that the touch operation is a second sliding operation, wherein a start position touched via the second sliding operation is within the display area displaying the specified function widget, and a final position touched via the second sliding operation is within a second target area, wherein the second target area is not within the display area displaying the specified function widget and the first target area.

12. The method of claim 1, wherein the first target area displays a text containing prompt information.

13. The method of claim 6, wherein performing the security verification on the fingerprint information comprises:
  determining that the security verification of the fingerprint information passes, in response to the fingerprint information being identical with valid fingerprint information stored in advance; and
  determining that the security verification of the fingerprint information fails, in response to the fingerprint information being different from the valid fingerprint information stored in advance.

14. The method of claim 13, further comprising:
  after determining that the security verification of the fingerprint information fails, displaying fingerprint-entering prompt information on the current display interface, wherein the fingerprint-entering prompt information is used for prompting a user to re-enter a fingerprint.

15. The method of claim 13, wherein after determining that the security verification of the fingerprint information fails, the method further comprises:
  counting the number of recognition failures, wherein the number of recognition failures is the number of consecutive fingerprint recognition failures; and
  displaying a password entering interface on the current display interface and prompting a user to enter a password via the password entering interface, in response to the number of recognition failures reaching a preset number.

16. The method of claim 6, further comprising:
  disabling the fingerprint sensor in response to detecting that the touch operation is a second sliding operation, wherein a start position touched via the second sliding operation is within the display area displaying the specified function widget, and a final position touched via the second sliding operation is within a second target area, wherein the second target area is not within the display area displaying the specified function widget and the first target area.

* * * * *